Dec. 22, 1964 D. A. ROBINSON 3,162,759

ANALOGUE DIVIDER CIRCUIT

Filed Aug. 10, 1961 2 Sheets-Sheet 1

$$\overline{E_4} = \frac{WE_2}{T} = \frac{A}{T} \cdot \frac{E_2}{E_1} = K\frac{E_2}{E_1}$$

$$E_2 \leq E_1 \frac{N_2}{N_1}$$

INVENTOR
DAVID A. ROBINSON

BY Stevens Davis Miller & Mosher
ATTORNEYS

Dec. 22, 1964

D. A. ROBINSON 3,162,759

ANALOGUE DIVIDER CIRCUIT

Filed Aug. 10, 1961

2 Sheets-Sheet 2

INVENTOR
DAVID A. ROBINSON

BY Stevens, Davis, Miller & Mosher

ATTORNEYS

United States Patent Office 3,162,759
Patented Dec. 22, 1964

3,162,759
ANALOGUE DIVIDER CIRCUIT

David A. Robinson, Fort Lauderdale, Fla., assignor to Airpax Electronics Incorporated, Fort Lauderdale, Fla., a corporation of Maryland Filed Aug. 10, 1961, Ser. No. 130,694
3 Claims. (Cl. 235—196)

This invention relates to magnetic computing circuits, and more particularly to computing circuits capable of producing an electrical output proportional to the quotient of two input signals.

Analogue division has always been difficult to perform in electrical control circuits. This function is often performed by mechanical slide wire servos. It is an object of this invention to provide a solid state circuit for performing this same arithmetic function. Other methods of division use an analogue multiplier placed in the feedback loop of a high gain amplifier. The present invention does not require a high gain amplifier but divides in a simple fashion using only switching transistors and magnetic components. It is, therefore, simple, reliable, accurate and inexpensive in comparison with other means.

Briefly, this invention provides a simple and easy way of producing an electrical output proportional to the quotient of two input signals. The constant volt-second area characteristic of a magnetic core, which has a substantially rectangular hysteresis loop, is used to produce pulse-width modulation. In this invention, a square-wave carrier input switches a pair of transistors alternately on and off so that a modulated square-wave is developed across the primary winding of the magnetic core, which has an amplitude proportional to one input signal. The output across the secondary winding of the magnetic core, which has a rectifier connected thereto, is a series of rectified constant volt-second pulses having a height proportional to the amplitude of the input signal and width inversely proportional to the amplitude of the input signal. A second input voltage signal is connected across the output of the circuit. A diode is connected in series with the second input signal to provide a clipping circuit at the output. The clipping circuit limits the height of the output pulse to the amplitude of the second input signal. Thus, the magnetic analogue computing circuit provides a pulsed output wherein each output pulse is characterized by a height equal to the amplitude of one input signal and a width inversely proportional to the amplitude of the other input signal. Therefore, the average output voltage of the magnetic computing circuit represents an analogue function of the two input voltages. The principal aim of this invention is to provide an improved magnetic analogue computing circuit whose average output voltage is proportional to the quotient of the two input voltages.

It is, therefore, the main object of this invention to provide a novel magnetic analogue computing circuit whose average output voltage is proportional to the quotient of two input voltages.

Another object of this invention is to provide an improved analogue dividing circuit which is simple with respect to operational requirements.

A further object of this invention is to provide a dividing circuit of the character referred to which is more precise and accurate than prior dividing circuits.

Other objects and advantages of the invention will become apparent from the following detailed description of a preferred embodiment of the invention when taken with the drawing in which.

Figures 1, 2:
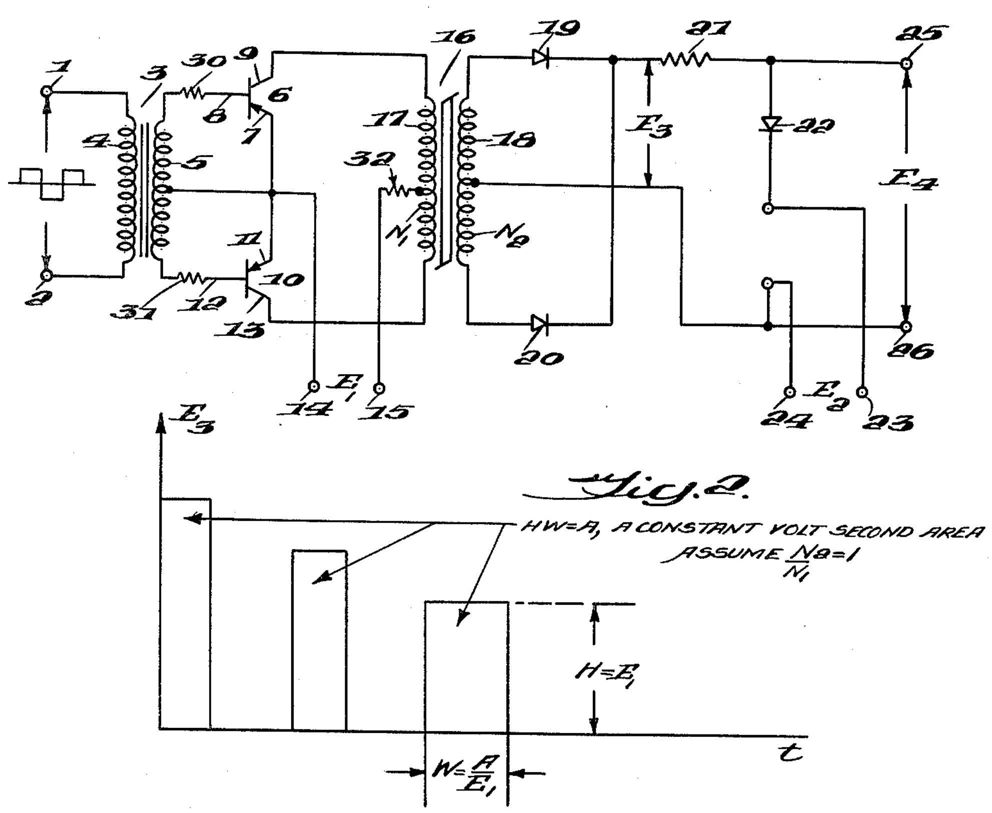
FIGURE 1 is a schematic diagram of a preferred embodiment of a magnetic analogue computing circuit which is a single quadrant divider.
FIGURE 2 is a graphical showing of the output voltage across the secondary winding of the magnetic core, which is a series of rectified constant volt-second pulses having a height proportional to the amplitude of the input signal and a width inversely proportional to the amplitude of the input signal.
Figures 4, 5:
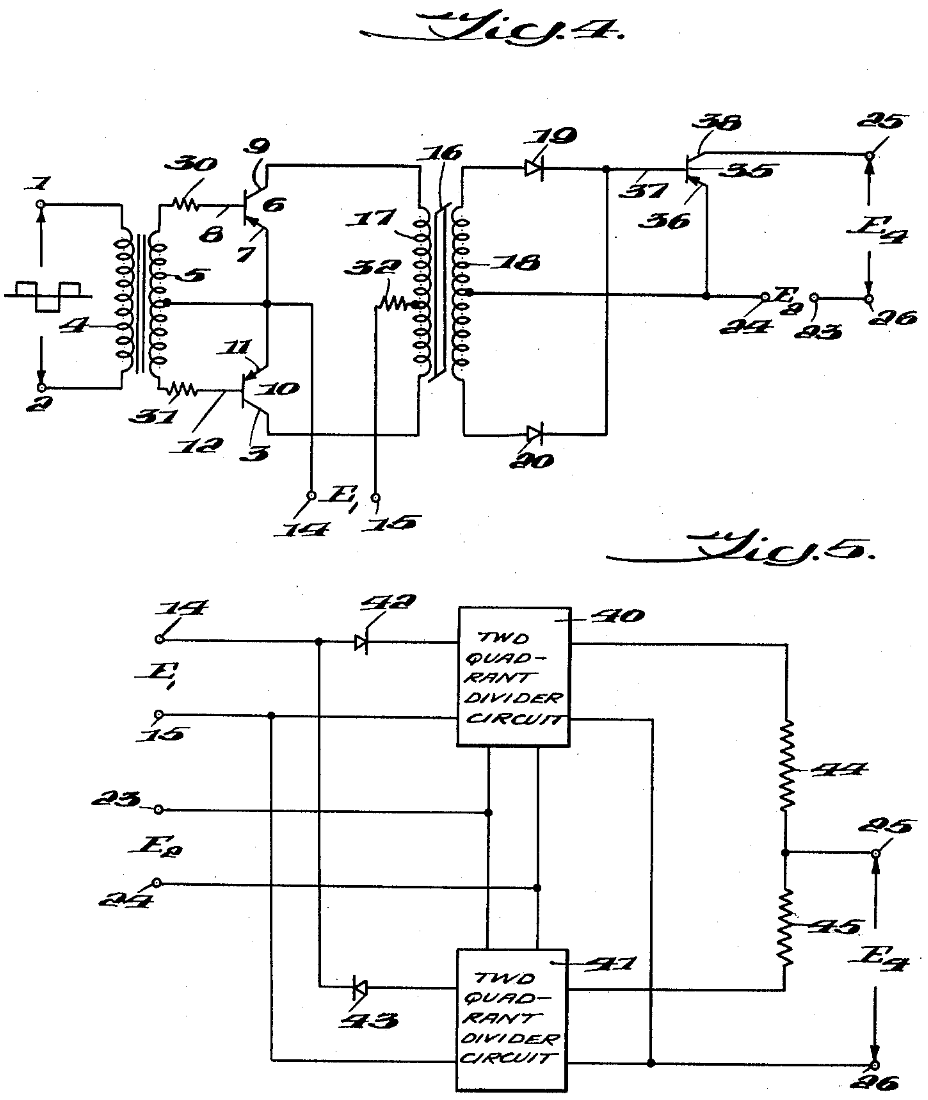
FIGURE 4 is a schematic diagram of a two quadrant divider.
FIGURE 5 is a schematic diagram of a four quadrant divider.

Referring now to FIGURE 1, there is shown a preferred embodiment of a magnetic analogue computing circuit. This circuit is a single quadrant divider, which is demonstrative of the basic principle of operation of the present invention. In this circuit, the two input voltages must both be positive, making it a one quadrant divider. It is not my intention to limit this invention to a one quadrant divider, but it may be converted to a two quadrant divider, as shown in FIGURE 4, or a four quadrant divider, as shown in FIGURE 5.

In the embodiment of FIGURE 1, a magnetic core material having a substantially rectangular hysteresis characteristic is utilized for transformer 16. The transformer 16 has a primary winding 17 and a secondary winding 18. A pair of transistors 6 and 10 are connected to the primary winding 17 of transformer 16. The PNP transistor 6 is comprised of emitter 7, a base 8 and a collector 9, while the PNP transistor 10 is comprised of emitter 11, a base 12 and a collector 13. It is appreciated that these transistors can also be NPN transistors. Collector 9 of transistor 6 is connected to one side of the primary winding 17 of transformer 16. Collector 13 of transistor 10 is connected to the other side of the primary winding 17. The emitters 7 and 11 of transistors 6 and 10 are interconnected. A square-wave carrier input is connected across terminals 1 and 2. This carrier input is fed into the bases 8 and 12 of transistors 6 and 10 through an input transformer 3. The input transformer is comprised of a primary winding 4 and secondary winding 5. The center tap on secondary winding 5 of transformer 3 is connected to the common point between emitters 7 and 11. Limiting resistors 30 and 31 are connected between the bases 8 and 12 and secondary winding 5. If the source voltage can be obtained from a balanced push-pull source, transformer 3 is not necessary.

An input signal $E_1$ is connected across terminals 14 and 15. Terminal 14 is connected to the emitters 7 and 11 of transistors 6 and 10. Terminal 15 is connected to the center of primary winding 17 of transformer 16 through limiting resistor 32. The square-wave carrier input, connected across terminals 1 and 2, switches a pair of transistors 6 and 10 alternately on and off so that a modulated square-wave is developed across the primary winding 17 of transformer 16, which has an amplitude proportional to the input signal $E_1$. A rectifier, consisting of diodes 19 and 20, is connected to the secondary winding 18 of transformer 16. The anode of diode 19 is connected to one side of the secondary winding 18, while the anode of diode 20 is connected to the other side of the secondary winding 18. The cathodes of diodes 19 and 20 are connected together. Secondary winding 18 has a center-tap connection. Voltage $E_3$ is the output voltage across the secondary winding 18 of the transformer 16.

Figure 3:
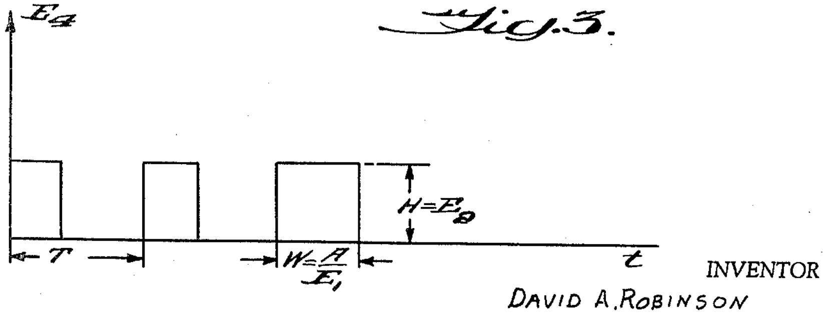
FIGURE 3 is a graphical showing of the pulsed output wherein each output pulse is characterized by a height equal to the amplitude of one input signal and a width inversely proportional to the amplitude of the other input signal.

Voltage $E_3$ is the voltage across the cathodes of diodes 19 and 20 and the center-tap connection of secondary winding 18. Because of the constant volt second area characteristic of the magnetic core of transformer 16, the voltage $E_3$ is a series of rectified constant volt-second pulses having a height proportional to the amplitude of input signal $E_1$ and a width inversely proportional to the amplitude of input signal $E_1$. The waveform of voltage $E_3$ is shown in FIGURE 2. Assuming that the number of turns of the primary winding 17 is equal to the number of turns of the secondary winding 18, the height of the pulses shown in FIGURE 3 is equal to the amplitude of the input signal $E_1$. With this condition, voltage $E_3$ is equal to voltage $E_1$. Since the core has a constant volt-second area characteristic, the width of the pulses in FIGURE 2 is inversely proportional to the amplitude of the input signal $E_1$. The constant volt-second area characteristic of the magnetic core provides pulse-width modulation. A second input signal $E_2$ is connected across terminals 23 and 24. To provide a clipping circuit, a diode is connected in series with the second input signal $E_2$. The cathode of diode 22 is connected to terminal 23. A resistor 21 is connected between the cathodes of diodes 19 and 20 and the anode of diode 22. The output voltage $E_4$ is connected across terminals 25 and 26. Terminal 25 is connected to the anode of diode 22. Terminal 26 is connected to terminal 24. The clipping circuit limits the height of the output pulse $E_4$ to the amplitude of the second input signal $E_2$. In order for the clipping circuit to operate, it is necessary that the voltage $E_2$ across terminals 23 and 24 be less than or equal to input voltage $E_1$ across terminals 14 and 15 times the turns ratio of the transformer 16. In this case, we have assumed that the turns ratio of transformer 16 is equal to one. Therefore, the voltage $E_2$ should be less than or equal to voltage $E_1$. The pulses of output voltage $E_4$ shown in FIGURE 3 have a height equal to the amplitude of input signal $E_2$ and a width inversely proportional to the amplitude of input signal $E_1$. The average output voltage $E_4$ is directly proportional to input signal $E_2$ divided by input signal $E_1$. Period T is the time between pulses. The average output voltage $E_4$ is equal to the width of the pulse times the amplitude of input signal $E_2$ divided by the period T. Since the area of the pulse is equal to the width of the pulse times the amplitude of signal $E_1$, the average output voltage $E_4$ is equal to the area of the pulse times the amplitude of input signal $E_2$ divided by the period T times the amplitude of input signal $E_1$. With the area of the pulse divided by the period T equal to a constant K, the average output voltage $E_4$ is proportional to input voltage $E_2$ divided by input voltage $E_1$. Therefore, the average output voltage $E_4$ represents an analogue function of the two input voltages $E_1$ and $E_2$. The magnetic analogue dividing circuit provides an average output voltage proportional to the quotient of the two input voltages $E_1$ and $E_2$.

The single quadrant divider shown in FIGURE 1 can be converted into a two quadrant divider. FIGURE 4 shows a two quadrant divider circuit in which the diode clamp 22 of FIGURE 1 is replaced by a transistor switch 35 so that $E_2$ may be either positive or negative. Transistor 35 is comprised of an emitter 36, a base 37 and a collector 38. The diodes 19 and 20 are connected together and then connected to the base 37 of transistor 35. Emitter 36 is connected to the center tap of secondary winding 18 of transformer 16. Collector 38 is connected to output terminal 25.

Combining two circuits 40 and 41 of FIGURE 4 as shown in FIGURE 5 allows $E_1$ to be either positive or negative which will activate the upper circuit 40 or the lower circuit 41 respectively. Diode 42 is connected to the input circuit 40, while diode 43 is connected to the input of circuit 41. Output terminal 25 is connected between two resistors 44 and 45. Since the output of each circuit is zero for the wrong polarity of $E_1$, their outputs may simply be summed as shown in FIGURE 5. Thus, the circuit of FIGURE 5 is a four-quadrant multiplier. It is understood that no quotient circuit can divide by zero.

The operation of the preferred embodiment of the invention shown in FIGURE 1 is as follows. A square-wave carrier input is connected across terminals 1 and 2. A positive input voltage $E_1$ is connected across terminals 14 and 15, and a positive input signal $E_2$ is connected across terminals 23 and 24. The square-wave carrier input signal switches the transistors 6 and 10 alternately on and off to produce a modulated square-wave across the primary winding 17. The modulated square-wave has an amplitude proportional to the amplitude of the input signal $E_1$. The rectified output signal $E_3$ across secondary winding 18 is a series of constant volt-second pulses having a height equal to the amplitude of the input signal $E_1$, and a width inversely proportional to the amplitude of the input signal $E_1$. The rectified output pulses across the secondary winding 18 is shown in FIGURE 2. The clipping circuit, which is connected across the output, limits the height of the output pulse to the amplitude of the input signal $E_2$. The output voltage $E_4$ across terminals 25 and 26 is a series of pulses having a height equal to the amplitude of input signal $E_2$ and a width inversely proportional to the amplitude of input signal $E_1$. The output voltage $E_4$ is shown in FIGURE 3. The average value of the output voltage $E_4$ is directly proportional to the amplitude of the input signal $E_2$ divided by the amplitude of the input signal $E_1$. Thus, the circuit provides a pulsed output wherein each output pulse is characterized by a height equal to the amplitude of one input voltage and a width inversely proportional to the amplitude of the other input signal. The average value of the output voltage is proportional to the quotient of the two input voltages.

The principles of this invention apply to a two quadrant divider circuit and a four quadrant divider circuit. The descriptions of the two quadrant divider circuit shown in FIGURE 4 and the four quadrant divider circuit shown in FIGURE 5 are similar to the single quadrant divider circuit shown in FIGURE 1.

Although the present invention has been shown and described in terms of a specific preferred embodiment, changes and modifications which do not depart from the inventive concept taught herein will suggest themselves to those skilled in the art. Such changes and modifications are deemed to fall within the scope and contemplations of the invention.

What is claimed is:

1. An analogue computing circuit comprising a core material having a substantially rectangular hysteresis characteristic, first and second mutually inductive windings wound thereon, amplifier means connected across said first winding, a carrier voltage source connected across the input of said amplifier means, a first voltage source connected between an intermediate point of said first winding and said amplifier means, clamping means connected at the output of the circuit, and a second voltage source connected in series with said clamping means to provide a pulsed output wherein each pulse has a height equal to the amplitude of said second voltage source and a width inversely proportional to the amplitude of said first voltage source.

2. An analogue computing circuit comprising a core material having a substantially rectangular hysteresis characteristic, center-tapped primary and secondary windings wound thereon, a pair of transistors having emitter, base and collector electrodes, said emitter electrodes interconnected, said collector electrodes connected to the ends of said primary winding, a carrier voltage source connected across said base electrodes, a first voltage source, means applying said first voltage source across said center-tapped primary winding and said interconnected emitter electrodes, diode means connected across the output of the circuit, and a second voltage source connected in series with said diode means to provide a pulsed output wherein each pulse has a height equal to the amplitude of said second voltage source and a width inversely proportional to the amplitude of said first voltage source.

3. An analogue computing circuit comprising a core material having a substantially rectangular hysteresis characteristic, first and second mutually inductive windings wound thereon, amplifier means connected across said first winding, a carrier voltage source connected across the input of said amplifier means, a first voltage source connected between an intermediate point of said first winding and said amplifier means, a transistor having an emitter, a base, and a collector connected between said second winding and the output of the circuit, and a second voltage source connected between said transistor and the output of the circuit to provide a pulsed output wherein each pulse has a height equal to the amplitude of said second voltage source and a width inversely proportional to the amplitude of said first voltage source.

References Cited in the file of this patent

UNITED STATES PATENTS

| | | |
|---|---|---|
| 2,941,722 | Van Allen | June 21, 1960 |
| 2,948,473 | Schaefer | Aug. 9, 1960 |

OTHER REFERENCES

Korn et al: Electronic Analog Computers, McGraw-Hill, 1952.